(12) United States Patent
Baechler et al.

(10) Patent No.: US 8,905,703 B2
(45) Date of Patent: Dec. 9, 2014

(54) LIFT GATE ASSEMBLY WITH PEDAL OPENER

(75) Inventors: Kim Baechler, London (CA); Timothy Writt, Woodstock (CA); Steve Crosby, Norwich (CA); Tim Dejonghe, Delhi (CA)

(73) Assignee: SAF-Holland, Inc., Holland, MI (US)

( * ) Notice: Subject to any disclaimer, the term of this patent is extended or adjusted under 35 U.S.C. 154(b) by 339 days.

(21) Appl. No.: 13/306,507

(22) Filed: Nov. 29, 2011

(65) Prior Publication Data

US 2013/0136566 A1 May 30, 2013

(51) Int. Cl.
*B60P 1/44* (2006.01)

(52) U.S. Cl.
CPC .............. *B60P 1/4414* (2013.01); *B60P 1/445* (2013.01)
USPC .......................................... 414/557; 414/558

(58) Field of Classification Search
CPC ................................ B60P 1/4414; B60P 1/445
USPC .......................................... 414/557, 558, 812
See application file for complete search history.

(56) References Cited

U.S. PATENT DOCUMENTS

| | | | |
|---|---|---|---|
| 2,600,577 A | 6/1952 | Roe | |
| 3,175,707 A * | 3/1965 | Mathers | 414/557 |
| 3,232,376 A * | 2/1966 | Lucas et al. | 182/97 |
| 3,246,777 A | 4/1966 | Tabordon | |
| 3,257,011 A * | 6/1966 | Randall et al. | 414/557 |
| 3,269,567 A * | 8/1966 | Lugash | 414/546 |
| 3,308,497 A * | 3/1967 | Lambert | 14/71.3 |
| 3,369,678 A | 2/1968 | Robinson | |
| 3,587,892 A * | 6/1971 | Vermette | 414/420 |
| 3,889,827 A | 6/1975 | Fine | |
| 4,007,844 A | 2/1977 | Perkins | |
| 4,095,704 A * | 6/1978 | Ratliff | 414/556 |
| 4,405,279 A | 9/1983 | Davy et al. | |
| 4,408,948 A | 10/1983 | Robinson | |
| 4,786,072 A * | 11/1988 | Girvin | 280/304.1 |
| 4,836,736 A | 6/1989 | Neagu | |
| 5,683,221 A | 11/1997 | Ablabutyan | |

FOREIGN PATENT DOCUMENTS

JP 62152937 A * 7/1987 .................. 414/557

* cited by examiner

*Primary Examiner* — James Keenan
(74) *Attorney, Agent, or Firm* — Price Heneveld LLP (57) ABSTRACT

A lift gate assembly for a vehicle that includes a platform assembly with a platform member. The assembly also includes a linkage assembly pivotally connected to the platform member and operably coupled to a vehicle, such that the platform member is pivotally moveable between a storage position and an in-use position. The assembly further includes a pedal opener coupled to the platform member at a location above the first pivot point when the platform member is in the storage position. The pedal opener also has a rearwardly disposed, upwardly facing surface configured to receive a generally downward applied force that assists pivotal movement of the platform member from the storage position to the in-use position.

21 Claims, 6 Drawing Sheets

LIFT GATE ASSEMBLY WITH PEDAL OPENER

BACKGROUND OF THE INVENTION

The present invention involves a lift gate assembly with a pedal opener that can be utilized for the loading of unloading of materials to be shipped. In particular, the present invention makes use of a pedal opener to assist in the safe and efficient movement of the lift gate assembly from a storage position to an in-use position.

Lift gate assemblies are used in a wide variety of applications associated with trucks, trailers and other types of vehicles to facilitate the loading and unloading of cargo. In general, they assist in the movement of cargo from a loading surface, such as the ground or a dock surface, to the height of the bed of a vehicle. Lift gate assemblies typically rely on hydraulic actuators to move cargo in this fashion.

During use, lift gate assemblies are typically extended from the rear of the vehicle and oriented in a horizontal position parallel to the vehicle bed or the ground. A platform of the lift gate assembly may rest on the ground to facilitate loading of cargo on to the assembly. After such loading, hydraulic actuators in connection with the lift gate assembly are activated and the platform of the assembly containing the load is moved vertically up to the height of the vehicle bed.

In storage, lift gate assemblies are typically stowed underneath the vehicle bed and secured with latches, shackles, chains, latching hooks or some other securing means. For example, the platform of the lift gate assembly may be folded into two sections, stored underneath the vehicle bed and secured to a hook attached to the bottom of the vehicle bed. In many configurations, the lift gate assembly is pivoted in a counter-clockwise direction toward the front of the vehicle for storage purposes.

When the lift gate assembly is needed for use, an operator disengages the securing means and moves the lift gate assembly from the storage position to one of the in-use positions. Known methods for moving the lift gate assembly from a storage position to the in-use position include the use of hydraulics or other electro-mechanical means. An operator may also move the assembly to an in-use position by engaging a handle on the platform and yanking the assembly rearward with a significant rotational force.

There are several disadvantages associated with the known designs and methods for moving lift gate assemblies from a storage position to an in-use position. For example, hydraulics and electro-mechanical system components dedicated solely for the purpose of moving the lift gate assembly from the storage position to an in-use position add significant cost and weight to the lift gate assembly. On the other hand, many operators are not physically capable of manually moving the lift gate assembly from the storage position to an in-use position by means of a handle or other equivalent means fixed to the platform. This is because the lift gate assembly is very heavy. Indeed, many operators simply lack the necessary strength to move or control the assembly in this fashion without significant risk of injury to themselves or others in the path of the lift gate assembly.

Consequently, a lift gate assembly is needed that not only provides all of the typical functions of a lift gate assembly, but also includes a means for easy deployment without significant risk of injury. Ideally, the deployment means would not significantly increase overall cost and weight to the lift gate assembly.

SUMMARY OF THE INVENTION

One aspect of the present invention is to provide a lift gate assembly for a vehicle with a platform assembly including a first platform member having a first end and a second end. The lift gate assembly also includes a linkage assembly including a first end pivotally connected to the first end of the first platform member at a first pivot point and a second end operably coupled to a vehicle, such that the first platform member is pivotally moveable about the first pivot point between a storage position, wherein at least a portion of the first platform member is located above and forward of the first pivot point, and an in-use position, and wherein the first platform member is extended substantially horizontally rearward from the first pivot point. The lift gate assembly further includes a pedal opener coupled to the first platform member at a location above the first pivot point when the first platform member is in the storage position, wherein the pedal opener includes a rearwardly disposed, upwardly facing surface configured to receive a generally downward applied force that assists pivotal movement of the first platform member about the first pivot point from the storage position to the in-use position.

Another aspect of the present invention is to provide a lift gate assembly for a vehicle with a platform assembly including a first platform member having a first end and a second end. The lift gate assembly also includes a linkage assembly including a first end pivotally connected to the first end of the first platform member at a first pivot point and a second end operably coupled to a vehicle, such that the first platform member is pivotally moveable about the first pivot point between a storage position, wherein at least a portion of the first platform member is located above and forward of the first pivot point, and an in-use position, and wherein the first platform member is extended substantially horizontally rearward from the first pivot point. The lift gate assembly further includes a pedal opener coupled to the first platform member at a location above the first pivot point when the first platform member is in the storage position, wherein the pedal opener includes a rearwardly disposed, upwardly facing surface dimensioned to receive a foot of an operator and a substantially downward force from a foot of an operator that assists pivotal movement of the first platform member about the first pivot point from the storage position to the in-use position.

A further aspect of the present invention is a method for deploying a vehicle lift gate assembly including the steps of providing a platform assembly that includes a first platform member having a first end and a second end, and providing a linkage assembly that includes a first end pivotally connected to the first end of the first platform member at a first pivot point and a second end operably coupled to a vehicle. The method also includes the step of moving the first platform member pivotally about the first pivot point between a storage position, wherein at least a portion of the first platform member resides above and forward of the first pivot point, and an in-use position, wherein the first platform member extends substantially horizontally rearward from the first pivot point. The method further includes the steps of providing a pedal opener coupled to the first platform member at a location above the first pivot point when the first platform member is in the storage position, wherein the pedal opener includes a rearwardly disposed, upwardly facing surface; and applying a generally downward force to the rearwardly disposed, upwardly facing surface at a location rearward from the first pivot point such that the applied force assists in the step of moving the first platform member pivotally about the first pivot point between the storage and the in-use position.

The present inventive lift gate assembly with pedal opener offers a unique lift gate assembly that can be easily and safely deployed. For example, one can manually deploy the lift gate assembly with the pedal opener by standing on the pedal, grasping the platform assembly, and applying minimal force to pivot the assembly from its storage position to an in-use, horizontal position. In addition, one may deploy the present inventive lift gate assembly using the pedal opener without risk of foot-pinching or other bodily hazards related to the movement of the platform assembly.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
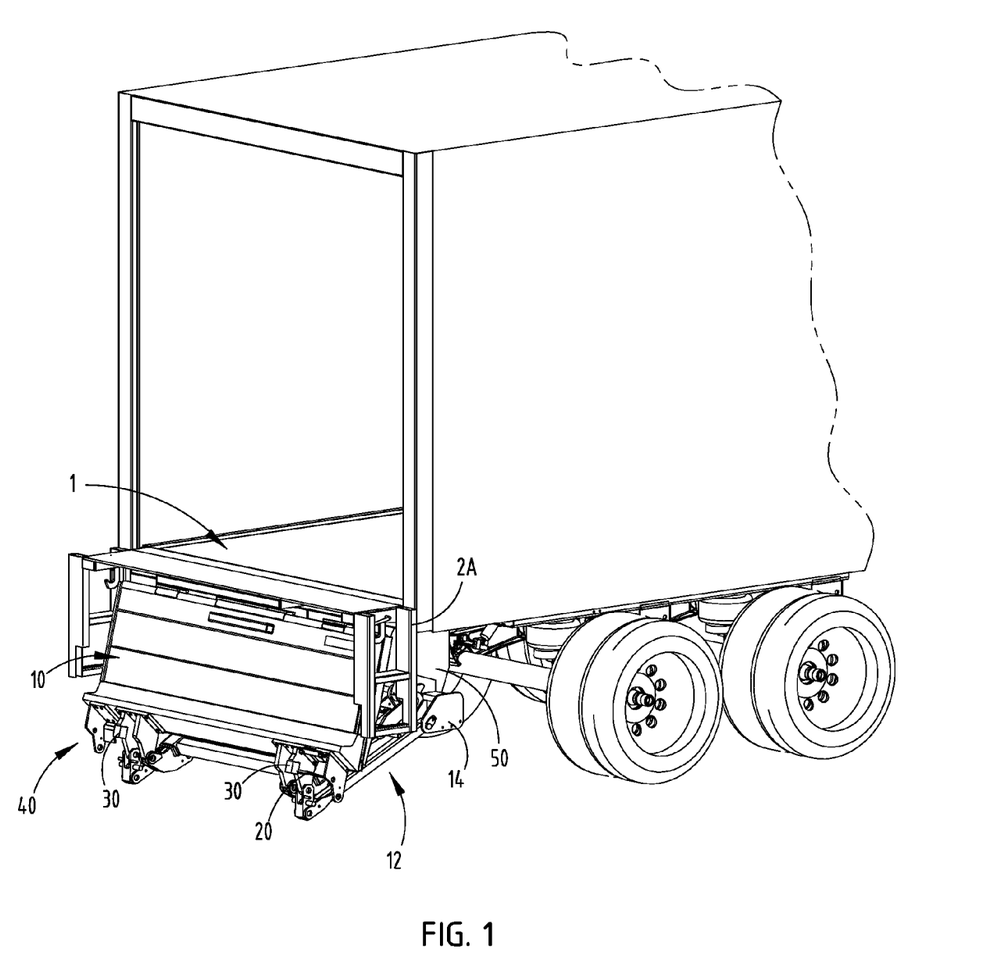
FIG. 1 is a rear perspective view of the lift gate assembly with pedal opener embodying the present invention, wherein the lift gate assembly is shown in a storage position and attached to the rear of a vehicle bed.

For purposes of description herein, the terms "upper," "lower," "right," "left," "rear," "front," "vertical," "horizontal," and their derivatives shall relate to the invention as oriented in FIG. 1. However, the invention may assume various alternative orientations and step sequences, except where expressly specified to the contrary. Further, the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting.

Figure 2:
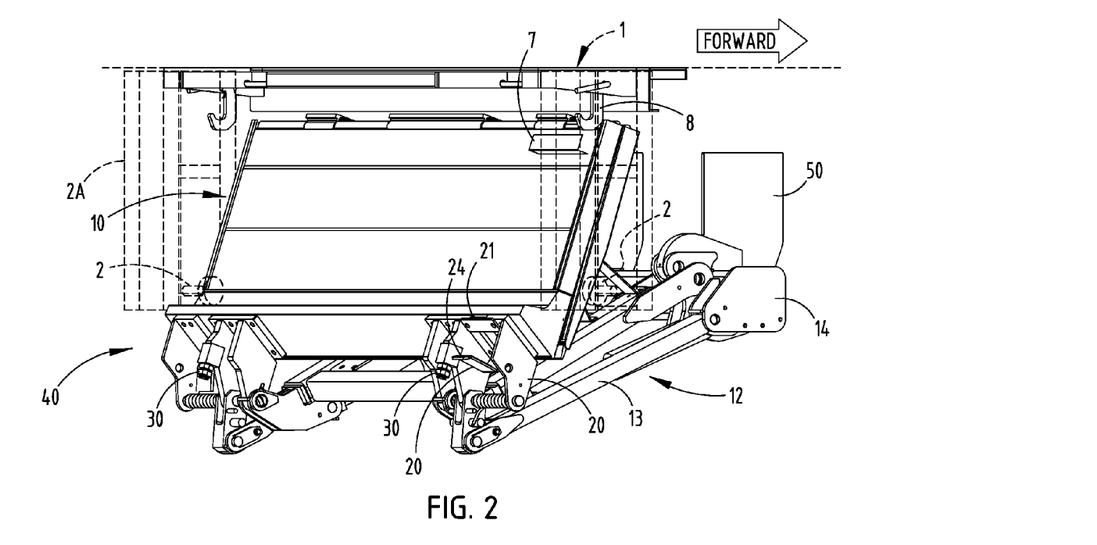
FIG. 2 is a rear perspective view of the lift gate assembly with pedal opener, wherein the lift gate assembly is shown in a storage position, resting on a roller coupled to the underside of a vehicle bed.

The reference numeral 40 (FIGS. 1 and 2) generally designates a lift gate assembly with pedal opener embodying the present invention. The lift gate assembly 40 is secured to the rear portion of a vehicle, for example, a truck, at attaching plate 50 so as to assist in the lifting of loads to the vehicle bed 1. In the example illustrated in FIGS. 1 and 2, a rear frame 2A is secured to vehicle bed 1 and positioned alongside lift gate assembly 40. Further, the lift gate assembly 40 includes a linkage assembly 12 with one end that is movably interconnected to the rear portion of the vehicle at rear vehicle coupling 14, and coupling 14 is secured to attaching plate 50. Lift gate assembly 40 also includes a pedal opener 20 coupled to a platform assembly 10.

Figure 2A:
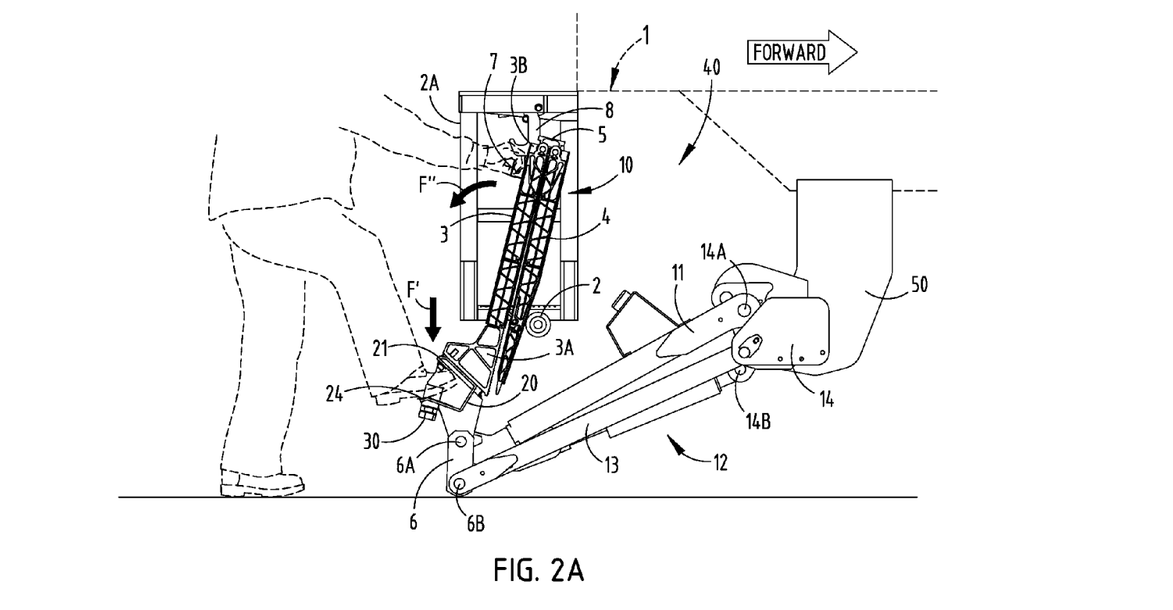
FIG. 2A is a side view and cross-section of the lift gate assembly with pedal opener as illustrated in FIG. 2, wherein the lift gate assembly is in a storage position and being engaged by an operator for deployment to an in-use position.
Figure 3:
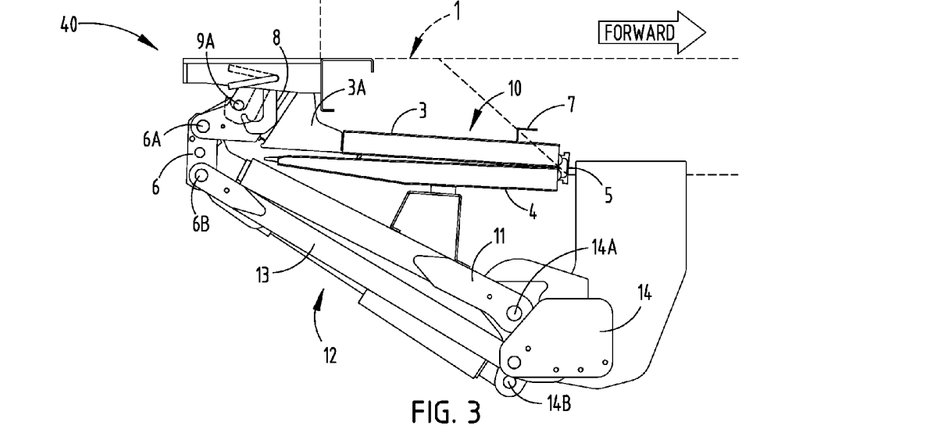
FIG. 3 is a side view of the lift gate assembly with pedal opener, wherein the lift gate assembly is shown in Storage Position A, latched to the underside of a vehicle bed.
Figure 3A:
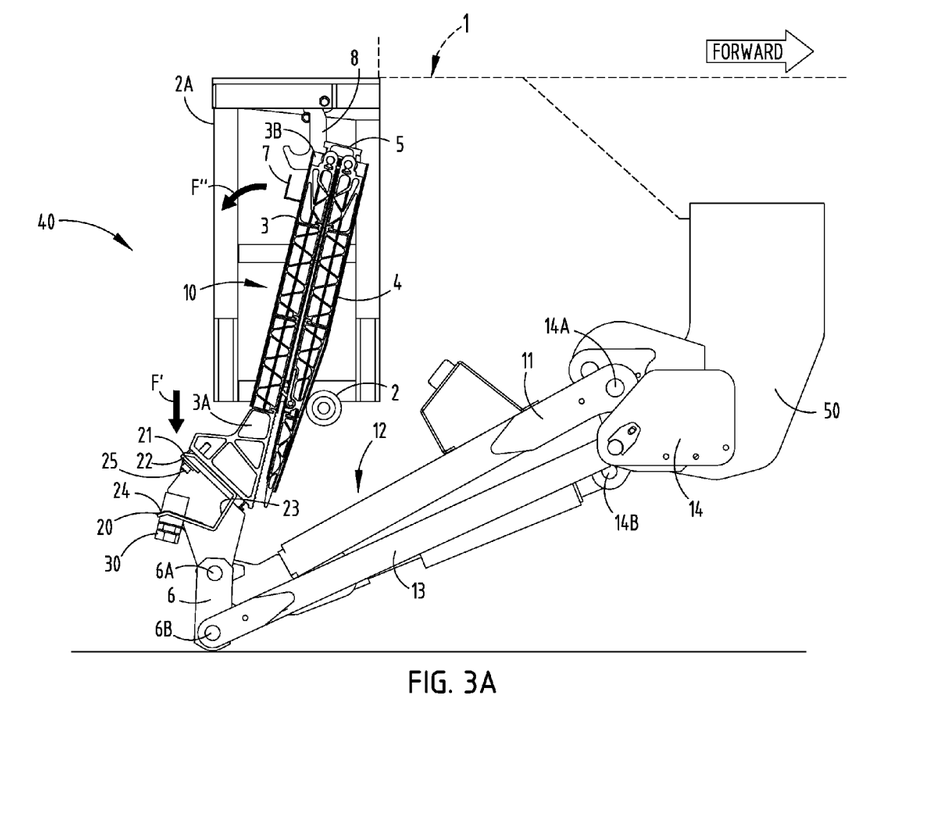
FIG. 3A is a side view of the lift gate assembly with pedal opener, wherein the lift gate assembly is shown in Storage Position B, resting on a roller coupled to the underside of a vehicle bed.

As illustrated in FIGS. 2A and 3A, lift gate assembly 40 comprises a platform assembly 10 with a first platform member 3 having a first end 3A and a second end 38. Platform assembly 10 also includes a second platform member 4. Second platform member 4 is coupled to second end 38 of platform member 3 at coupling 5. Coupling 5 may constitute a hinge, moveable joint or any other coupling structure allowing movement of the platform members 3 and 4 relative to one another. Furthermore, the first end 3A of platform assembly 10 is pivotally connected to a linkage 6 at pivot point 6A.

Linkage assembly 12 includes a pair of upper bars 11 and a pair of lower bars 13. Upper bars 11 are pivotally connected to linkage 6 at pivot point 6A and lower bars 13 are pivotally connected to linkage 6 at pivot point 6B. Hence, upper bars 11 and lower bars 13 are pivotally connected to platform assembly 10 via linkage 6 at pivot points 6A and 6B. Furthermore, linkage assembly 12 is coupled to rear vehicle coupling 14 allowing movement of the linkage assembly 12 relative to the vehicle coupling 14. For example, upper bar 11 is coupled to pivot point 14A and lower bar 13 is coupled to pivot point 14B, both couplings arranged in a hinge-like configuration.

As illustrated in FIG. 3, lift gate assembly 40 may be configured in a storage position (Storage Position A) for stowage beneath vehicle bed 1. To stow lift gate assembly 40, first platform member 3 is pivoted forward and clockwise about pivot point 6A to a position in which a least a portion of platform member 3 is above and forward of pivot point 6A. After this movement, platform assembly 10 may be stowed and secured beneath vehicle bed 1. For example, latch point 9A on first platform member 3 can be secured to latch hook 8 on vehicle bed 1 by engaging hook 8 with latch point 9A. In addition, second platform member 4 may be folded beside first platform member 3 about coupling 5 to facilitate storage of platform assembly 10 beneath vehicle bed 1.

To facilitate deployment of lift gate assembly 40, the entire assembly is disengaged from vehicle bed 1 and moved downward toward the ground (FIG. 3A). Hook 8 may be removed from latch point 9A, thereby freeing platform assembly from vehicle bed 1 (FIG. 3). Further, upper bars 11 and lower bars 13 of linkage assembly 12 are pivoted in a rearward and counter-clockwise direction by a hydraulic, mechanical or other suitable electro-mechanical means to move linkage 6 and platform assembly 10 downward toward the ground (FIGS. 3 and 3A). As platform assembly 10 is moved downward toward the ground alongside rear frame 2A, manual roller 2, secured to rear frame 2A, engages platform assembly 10 (FIG. 3A). As platform assembly 10 continues its downward motion toward the ground, manual roller 2 forces platform assembly 10 to begin pivoting rearward and counter-clockwise about pivot point 6A. In this storage position (Storage Position B), first platform member 3 remains above and forward of pivot point 6A.

Figure 4:
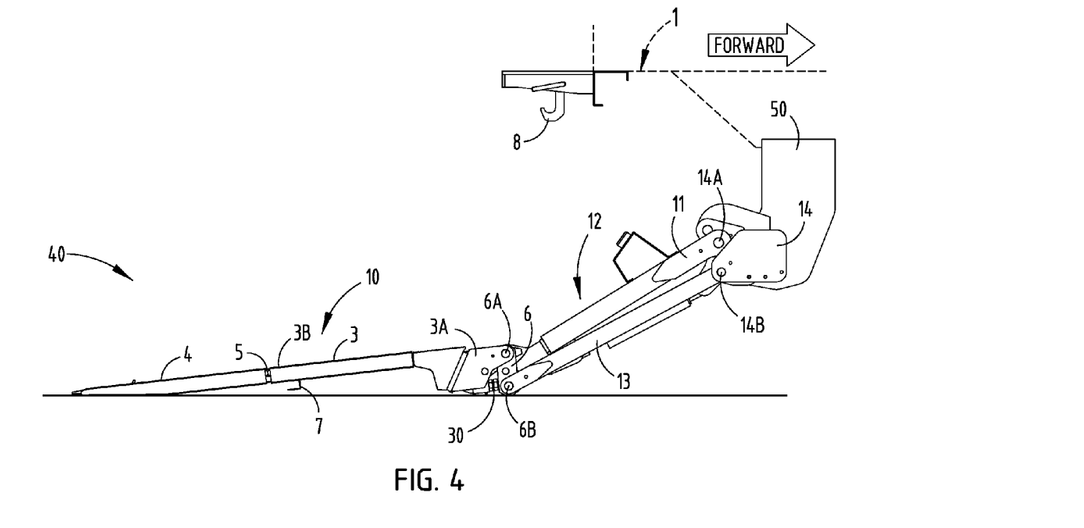
FIG. 4 is a side view of the lift gate assembly with pedal opener, wherein the lift gate assembly is shown in In-use Position A, resting on the ground.
Figure 4A:
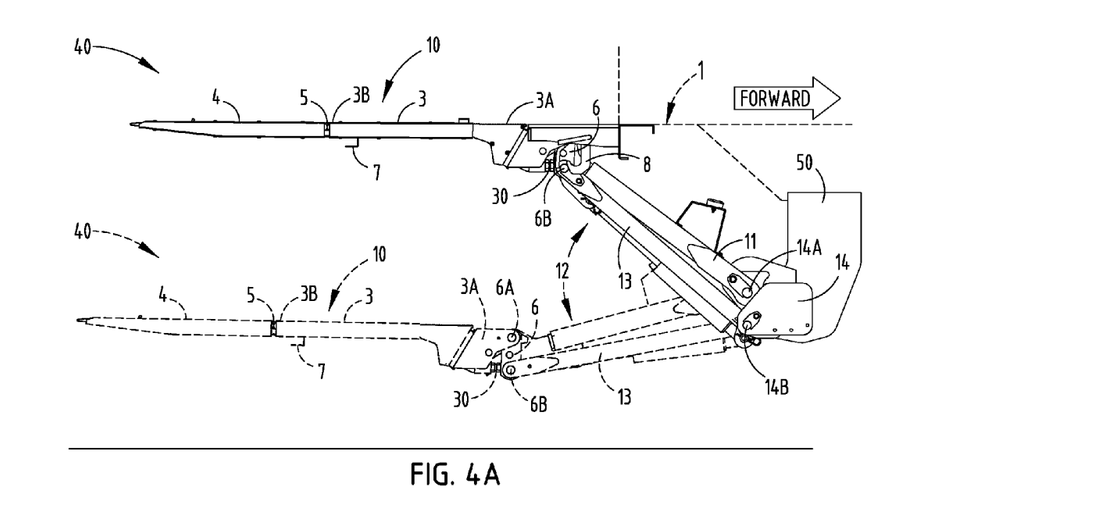
FIG. 4A is a side view of the lift gate assembly with pedal opener, wherein the lift gate assembly is shown in in-use Position B, substantially parallel and level with the vehicle bed.

An operator may deploy lift gate assembly 40 from a storage position as shown in FIG. 3A (Storage Position B) to an in-use position as shown in FIG. 4 (In-use Position A) and FIG. 4A (In-use Position B). In order for lift gate assembly 40 to move from a storage position to an in-use position, platform assembly 10 must be pivoted in a rearward and counter-clockwise direction (see FIG. 3A). In particular, first platform member 3 is pivoted counter-clockwise about pivot point 6A to a position in which platform member 3 is extended from pivot point 6A in a rearward direction, substantially parallel to the ground or vehicle bed 1 (see FIGS. 4 and 4A). At this point, platform assembly 10 may be raised or lowered to be level with the ground (FIG. 4) or vehicle bed 1 (FIG. 4A). An operator may raise or lower lift gate assembly 40 between In-use Position A and B (FIGS. 4 and 4A) by operating the same hydraulic, mechanical or other suitable electro-mechanical means capable of moving lift gate assembly 40 from Storage Position A to Storage Position B (see FIGS. 3 and 3A).

As illustrated in FIG. 3A, lift gate assembly 40 invention includes pedal opener 20 to assist an operator in the movement of lift gate assembly 40 from Storage Position B (FIG. 3A) to In-use Position (FIGS. 4 and 4B). Pedal opener 20 is coupled to first platform member 3 at an attachment location 21 (see FIG. 6) defined above pivot point 6A when platform member 3 remains above and forward of pivot point 6A (e.g., when platform assembly 10 is moved to Storage Position B). Pedal opener 20 is further defined with a rearwardly disposed, upwardly facing surface 24 of sufficient width and depth to receive a foot from an operator (see FIG. 2A).

Pedal opener 20 is further arranged such that when the foot from an operator engages the upwardly facing surface 24 of pedal opener 20 (see FIGS. 2A and 3A), a downward force F', applied from the foot of the operator assists in the movement of lift gate assembly 40 from a storage position (FIG. 3A) to an in-use position (see FIG. 4). For example, an operator may engage handle 7 and pedal opener 20, both attached to first platform member 3, and manually rotate platform assembly 10 with a rotational force F'' in a rearward, clockwise direction from a storage position to an in-use position (FIGS. 4 and 4A). Indeed, the application of downward force F' to pedal opener 20 creates a moment arm about pivot point 6A that assists the operator in moving platform assembly 10 to an in-use position (FIGS. 4 and 4A). The force generated by this moment arm about pivot point 6A from downward force F' greatly supplements any rotational force F''' applied to first platform member 3 about pivot point 6A by the operator via handle 7.

Figure 6:
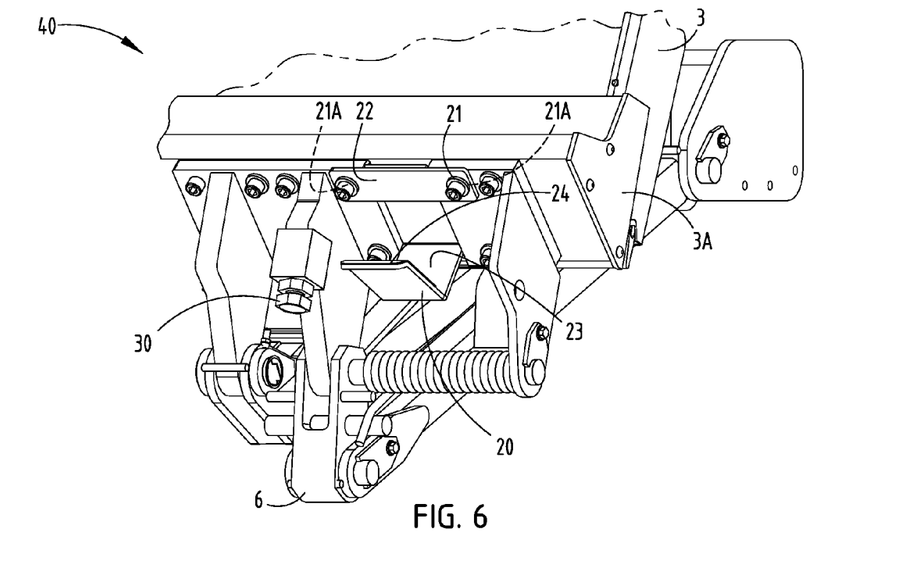
FIG. 6 is an enlarged rear perspective view of the lift gate assembly with pedal opener as illustrated in FIG. 2, wherein the lift gate assembly is shown in a storage position.
Figures 6A, 6B:
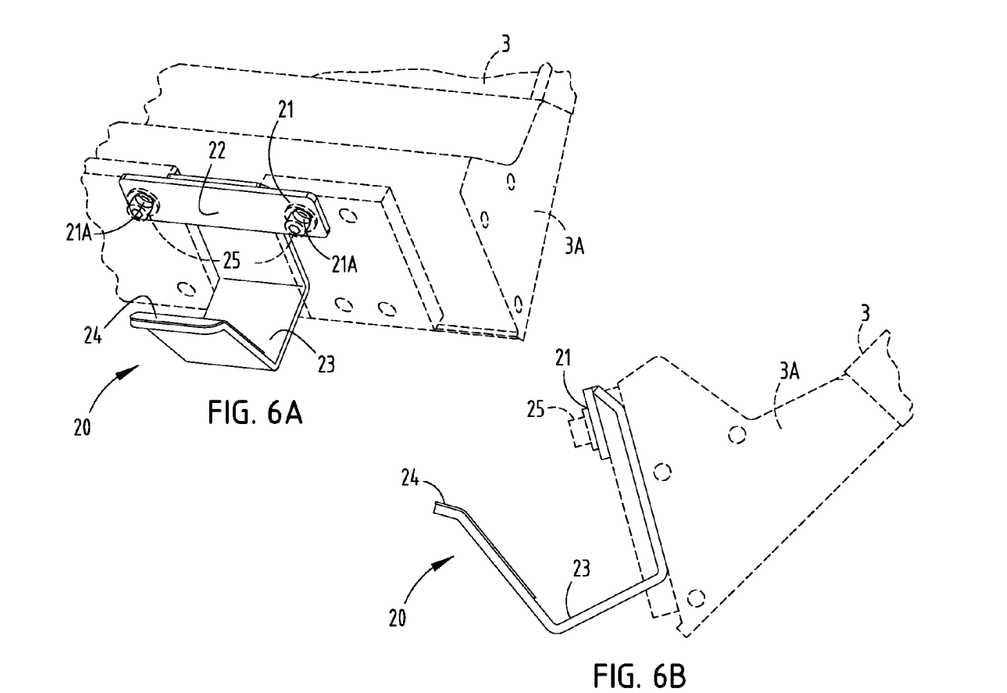
FIG. 6A is an enlarged perspective view of the pedal opener embodying the present invention as illustrated in FIG. 6.
FIG. 6B is a side view of the pedal opener embodying the present invention as illustrated in FIG. 6.

In some configurations, as illustrated in FIGS. 6, 6A and 6B, pedal opener 20 is configured with a U-shaped step portion 23 having a horizontally and upwardly facing surface 24 when platform assembly 10 is in a storage position in which platform assembly 10 has been engaged by manual roller 2 (e.g., Storage Position B as shown in FIG. 3A). Pedal opener 20 is further configured with a connection portion 22 having a pair of bolt-receiving apertures 21A by which pedal opener 20 is coupled to first platform member 3 via bolts 25 (see FIG. 6). When pedal opener 20 is configured with a U-shaped step portion 23, an operator can apply a downward force F' to upwardly facing surface 24 to create a moment arm about pivot point 6A that assists the operator in moving platform assembly 10 to an in-use position (FIGS. 4 and 4A).

Figure 5:
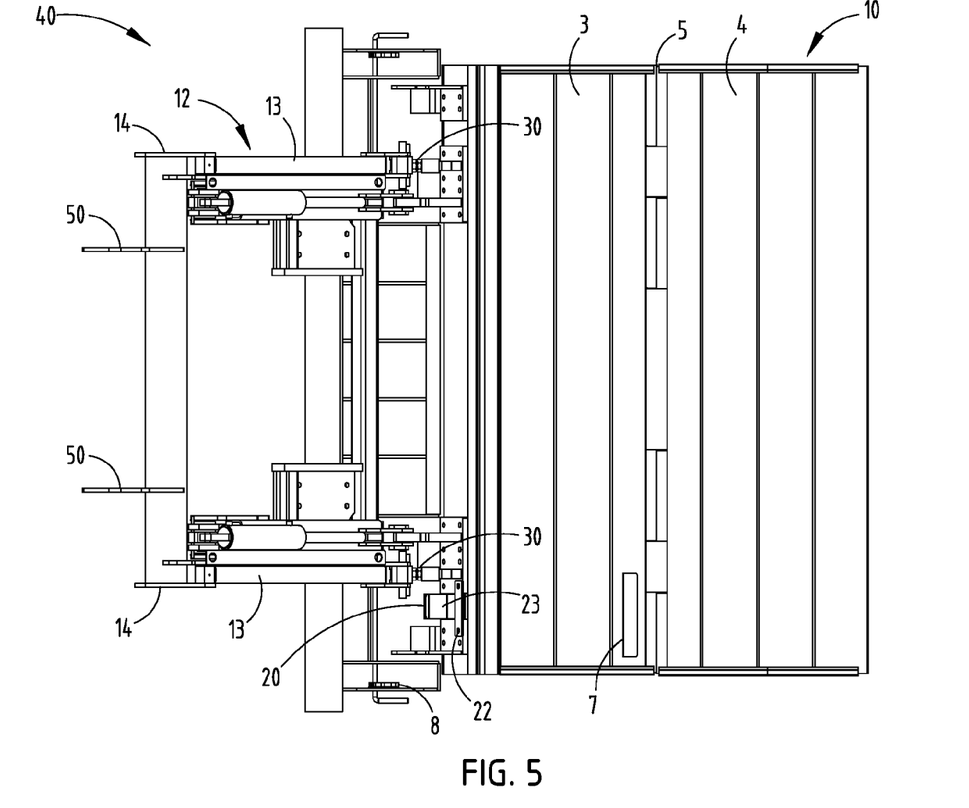
FIG. 5 is a plan view of the underside of the lift gate assembly with pedal opener, wherein components of the platform and linkage assemblies have been illustrated.
Figure 5A:
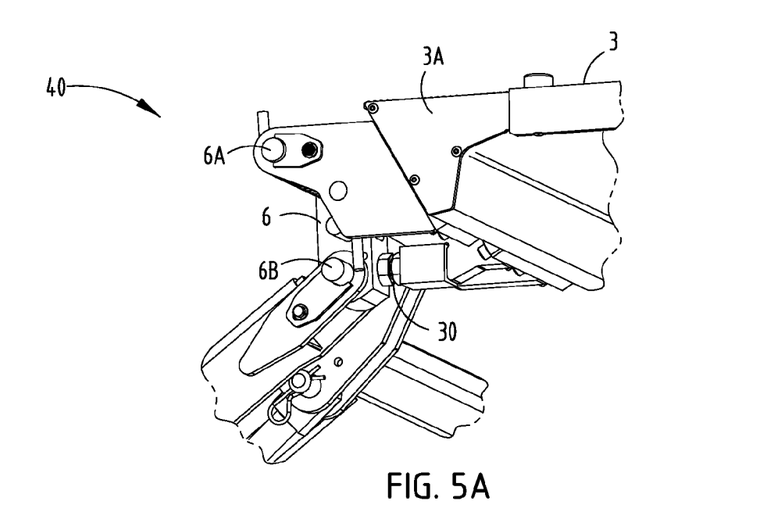
FIG. 5A is an enlarged perspective view of the stop member on the platform assembly, as engaged with the linkage coupled to the linkage assembly to arrest pivotal motion of the platform assembly.

As illustrated in FIGS. 5 and 5A, lift gate assembly 40 may be configured with a stop member 30 to arrest rearward and counter-clockwise pivotal motion of the platform assembly 10 about pivot point 6A to an in-use position. Stop member 30 is coupled to first platform member 3 and may constitute an angle iron, bracket, bolt, or other suitable structure to arrest motion of the platform assembly 10 as it moves to an in-use position. As depicted in FIGS. 4 and 4A, stop member 30 can constitute an adjustable bolt suitable for varying the pitch of platform assembly 10 once platform assembly 10 has been moved into an in-use position. Stop member 30 arrests pivotal motion of platform assembly 10 to an in-use position by engaging linkage 6 (see FIG. 5A).

The present inventive lift gate assembly with pedal opener offers a unique lift gate assembly that can be easily and safely deployed. For example, one can manually deploy the lift gate assembly with the pedal opener by standing on the pedal, grasping a handle fixed to the platform assembly, and applying minimal force to pivot the assembly from its storage position to an in-use, substantially horizontal position, in addition, one may deploy the present inventive lift gate assembly using the pedal opener without risk of foot-pinching or other bodily hazards related to the movement of the platform assembly.

Those skilled in the art will readily appreciate from the foregoing description that modifications may be made to the invention without departing from the concepts disclosed herein. Such modifications are to be considered with the scope of the following claims, unless these claims by their express language state otherwise. Accordingly, the scope of the present invention should be considered in terms of the following claims and is understood not be limited to the details of the structure and operation shown and described in the foregoing specification and drawings.

The invention claimed is:

1. A lift gate assembly for attachment to a rearward end of a vehicle, the lift gate assembly comprising:
    a platform assembly including a first platform member having a first end and a second end;
    a linkage assembly including a first end pivotally connected to the first end of the first platform member via a first pivot point and a second end operably coupled to a vehicle, such that the first platform member is pivotally moveable about the first pivot point between a raised first storage position, wherein at least a portion of the first platform member is located above and forward of the first pivot point, and a lowered first in-use position, wherein the first platform member is extended substantially horizontally rearward from the first pivot point; and
    a pedal opener coupled to the first platform member at a location above the first pivot point when the first platform member is in the raised first storage position, wherein the pedal opener is located between the first pivot point and the first end of the first platform member, and wherein the pedal opener includes a rearwardly disposed, upwardly facing surface configured to receive a generally downward applied force that assists pivotal movement of the first platform member about the first pivot point from the raised first storage position down to the lowered first in-use position.

2. The lift gate assembly of claim 1, further including:
    a stop member coupled to the first platform member, wherein the stop member arrests pivotal movement of the first platform member about the first pivot point to the first in-use position.

3. The lift gate assembly of claim 2, wherein the pedal opener includes a U-shaped step portion comprising the rearwardly disposed, upwardly facing surface and a connection portion coupled to the first platform member.

4. The lift gate assembly of claim 1, wherein the platform assembly includes a second platform member operably coupled to the second end of the first platform member, such that the second platform member is operable between a second storage position, wherein at least a portion of the second platform member is located above and forward of the first pivot point, and a second in-use position, wherein the second platform member is extended substantially horizontally rearward from the first platform member.

5. The lift gate assembly of claim 4, wherein the pedal opener includes a U-shaped step portion comprising the rearwardly disposed, upwardly facing surface and a connection portion coupled to the first platform member.

6. The lift gate assembly of claim 1, wherein the linkage assembly includes a pair of upper bars and a pair of lower bars, the upper bars having first ends pivotally connected to the first end of the first platform member at the first pivot point, the lower bars having first ends pivotally connected to a linkage secured to the first platform member and second ends of the upper and lower bars operably coupled to a vehicle.

7. The lift gate assembly of claim 6, wherein the pedal opener includes a U-shaped step portion comprising the rearwardly disposed, upwardly facing surface and a connection portion coupled to the first platform member.

8. The lift gate assembly of claim 1, wherein the pedal opener includes a U-shaped step portion comprising the rearwardly disposed, upwardly facing surface and a connection portion coupled to the first platform member.

9. A lift gate assembly for attachment to a rearward end of a vehicle, the lift gate comprising:
   a platform assembly including a first platform member having a first end and a second end;
   a linkage assembly including a first end pivotally connected to the first end of the first platform member via a first pivot point and a second end movably interconnected to a vehicle, such that the first platform member is pivotally moveable about the first pivot point between a raised first storage position, wherein at least a portion of the first platform member is located above and forward of the first pivot point, and a lowered first in-use position, wherein the first platform member is extended substantially horizontally rearward from the first pivot point; and
   a pedal opener coupled to the first platform member at a location above the first pivot point when the first platform member is in the first raised storage position, wherein the pedal opener is located between the first pivot point and the first end of the first platform member, and wherein the pedal opener includes a rearwardly disposed, upwardly facing surface dimensioned to receive a foot of an operator and a substantially downward force from a foot of an operator that assists pivotal movement of the first platform member about the first pivot point from the raised first storage position down to the lowered first in-use position.

10. The lift gate assembly of claim 9, further including:
    a stop member coupled to the first platform member, wherein the stop member arrests pivotal movement of the first platform member about the first pivot point to the first in-use position.

11. The lift gate assembly of claim 10, wherein the pedal opener includes a U-shaped step portion comprising the rearwardly disposed, upwardly facing surface and a connection portion coupled to the first platform member.

12. The lift gate assembly of claim 9, wherein the platform assembly includes a second platform member operably coupled to the second end of the first platform member, such that the second platform member is operable between a second storage position, wherein at least a portion of the second platform member is located above and forward of the first pivot point, and a second in-use position, wherein the second platform member is extended substantially horizontally rearward from the first platform member.

13. The lift gate assembly of claim 12, wherein the pedal opener includes a U-shaped step portion comprising the rearwardly disposed, upwardly facing surface and a connection portion coupled to the first platform member.

14. The lift gate assembly of claim 9, wherein the linkage assembly includes a pair of upper bars and a pair of lower bars, the upper bars having first ends pivotally connected to the first end of the first platform member at the first pivot point, the lower bars having first ends pivotally connected to a linkage attached to the first platform member and second ends of the upper and lower bars operably coupled to a vehicle.

15. The lift gate assembly of claim 14, wherein the pedal opener includes a U-shaped step portion comprising the rearwardly disposed, upwardly facing surface and a connection portion coupled to the first platform member.

16. The lift gate assembly of claim 9, wherein the pedal opener includes a U-shaped step portion comprising the rearwardly disposed, upwardly facing surface and a connection portion coupled to the first platform member.

17. A method for deploying a vehicle lift gate assembly from a rearward end of a vehicle, the method comprising the steps of:
    providing a platform assembly that includes a first platform member having a first end and a second end;
    providing a linkage assembly that includes a first end pivotally connected to the first end of the first platform member via a first pivot point and a second end operably coupled to a vehicle;
    moving the first platform member pivotally about the first pivot point between a raised first storage position, wherein at least a portion of the first platform member resides above and forward of the first pivot point, and a lowered first in-use position, wherein the first platform member extends substantially horizontally rearward from the first pivot point;
    providing a pedal opener coupled to the first platform member at a location above the first pivot point when the first platform member is in the raised first storage position, wherein the pedal opener is located between the first pivot point and the first end of the first platform member, and wherein the pedal opener includes a rearwardly disposed, upwardly facing surface; and
    applying a generally downward force to the rearwardly disposed, upwardly facing surface at a location rearward from the first pivot point such that the applied force assists in the step of moving the first platform member pivotally about the first pivot point from the raised first storage position down to the lowered first in-use position.

18. The method in accordance with claim 17, wherein the step of moving the first platform member about the first pivot point between the first storage position and the first in-use position concludes when a stop member coupled to the first platform member arrests pivotal movement of the first platform member about the first pivot point.

19. The method in accordance with claim 17, wherein the step of providing a platform assembly further includes the provision of a second platform member operably coupled to the second end of the first platform member, such that the second platform member is operable between a second storage position, wherein at least a portion of the second platform member is located above and forward of the first pivot point, and a second in-use position, wherein the second platform member is extended substantially horizontally rearward from the first platform member.

20. The method in accordance with claim 17, wherein the step of providing a linkage assembly further includes the provision of a pair of upper bars and a pair of lower bars, the upper bars having first ends pivotally connected to the first end of the first platform member at the first pivot point, the lower bars having first ends pivotally connected to a linkage attached to the first platform member, and second ends of the upper and lower bars operably coupled to a vehicle.

21. The method in accordance with claim 17, wherein the step of providing a pedal opener further includes the provision of the pedal configured with a U-shaped step portion comprising the rearwardly disposed, upwardly facing surface and a connection portion coupled to the first platform member.

* * * * *